Aug. 20, 1940. G. T. PFLEGER 2,211,986
VARIABLE SPEED ELECTRIC MOTOR DRIVE
Filed April 22, 1933 5 Sheets-Sheet 1

INVENTOR
George T. Pfleger
BY John Flam
ATTORNEY

Aug. 20, 1940.  G. T. PFLEGER  2,211,986
VARIABLE SPEED ELECTRIC MOTOR DRIVE
Filed April 22, 1933   5 Sheets-Sheet 2

INVENTOR
George T. Pfleger
BY John Flam
ATTORNEY

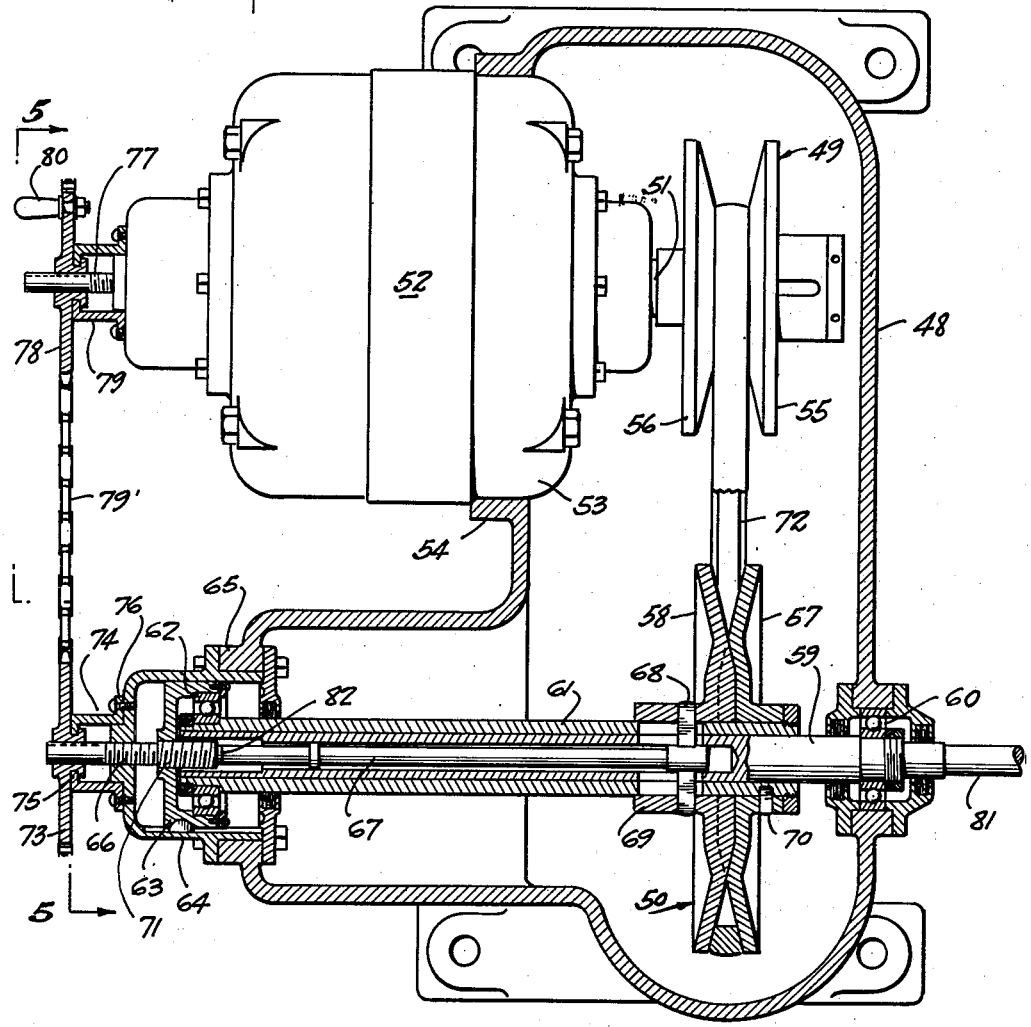

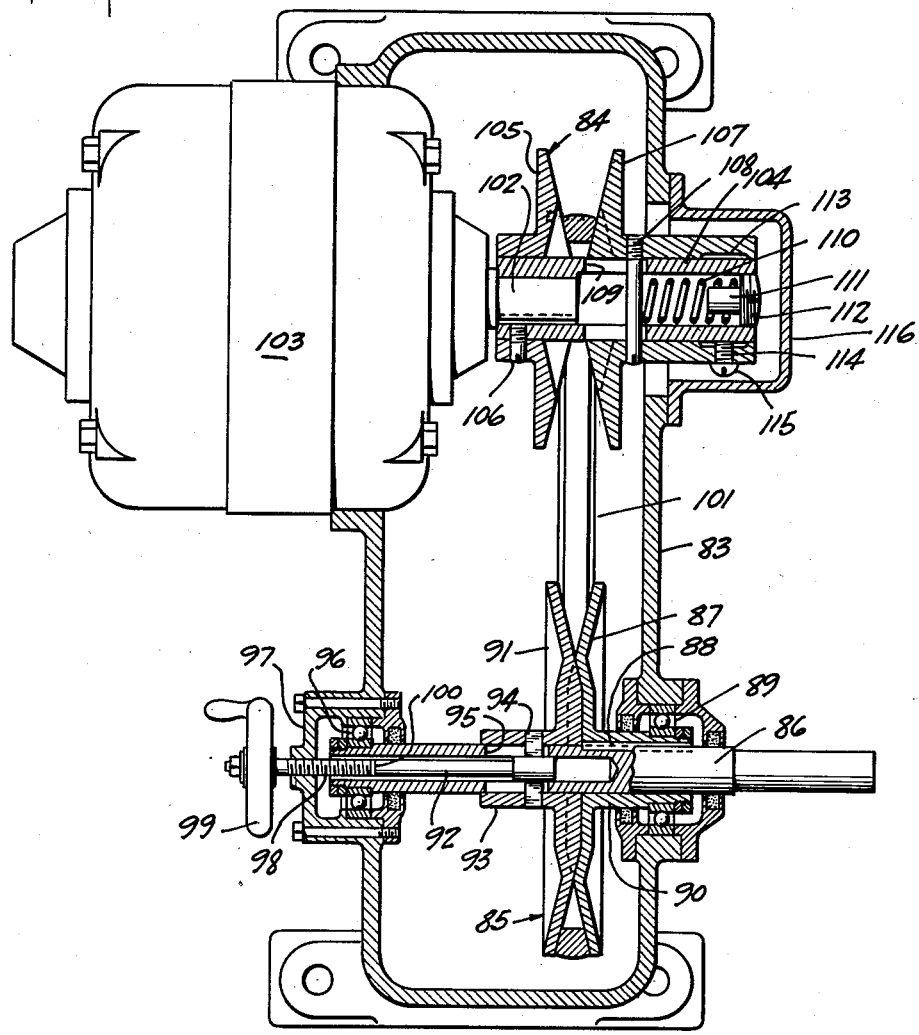

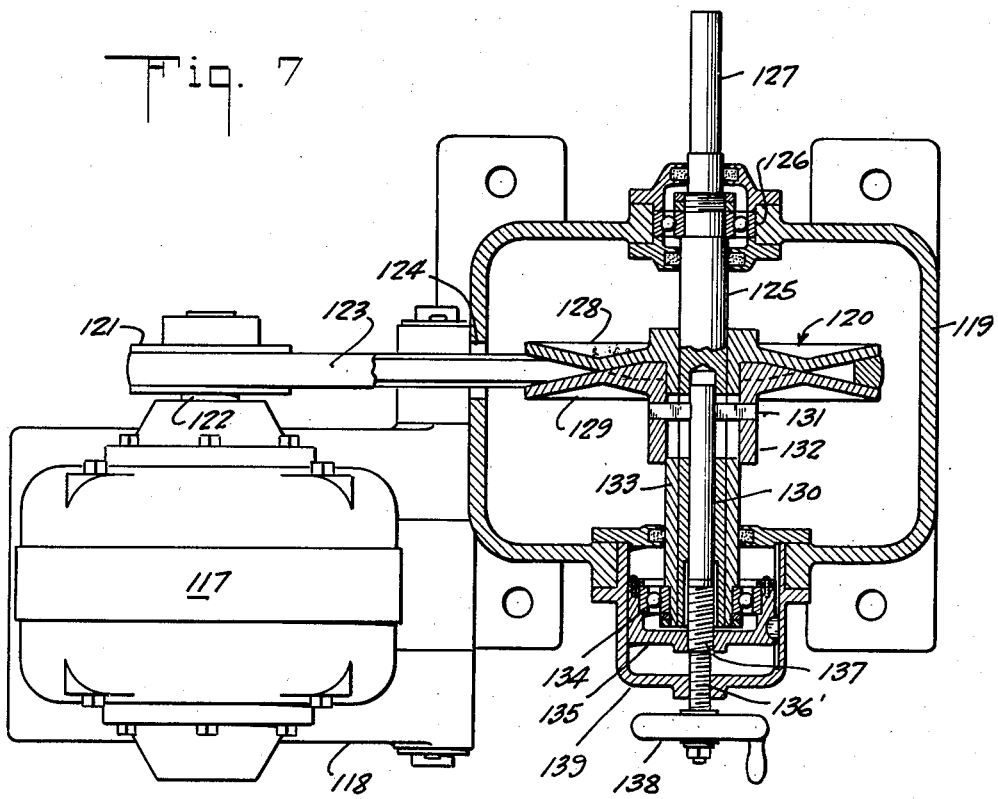
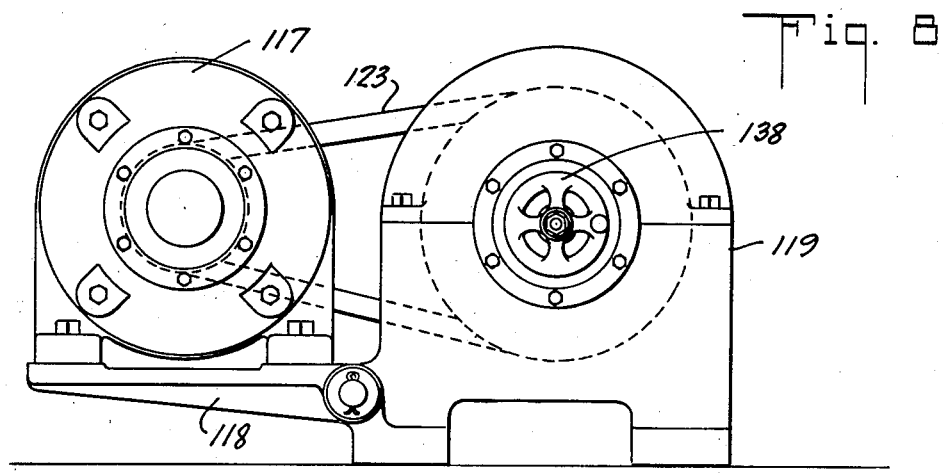

Patented Aug. 20, 1940

2,211,986

UNITED STATES PATENT OFFICE 2,211,986

VARIABLE SPEED ELECTRIC MOTOR DRIVE

George T. Pfleger, Los Angeles, Calif., assignor to U. S. Electrical Motors, Inc., a corporation of California Application April 22, 1933, Serial No. 667,387

34 Claims. (Cl. 74—230.17)

This invention relates to a variable speed drive, utilizing an electric motor as the source of power.

As elements of the drive, there may be utilized pulleys and a belt, between the driving and the driven shafts, at least one of the pulleys having a variable effective diameter. The variation in effective diameter is secured by the aid of a pulley structure having a pair of relatively axially movable sections, having opposed inclined belt engaging faces; and by the aid of a V-belt in contact on its opposite sides, with these faces. When the opposed faces are moved toward each other, the belt is urged radially outwardly, and the effective pulley diameter is increased; and conversely, when the faces are permitted to move apart, the belt moves radially inwardly between them, and the pulley diameter is decreased.

One of the problems encountered with such installations is to keep the belt in proper alinement between the pulleys with which it is engaged; and another is to keep the belt in proper tightened condition at all times, to create a sufficient pressure between the belt and the pulleys to carry the power to be transmitted.

It is one of the objects of my invention to provide a simple and compact mechanism for securing these results.

It has been proposed in the past to take up belt slack in such devices by the aid of either a weight or a spring, or both. Such an arrangement however, requires that the weight or the spring be so strong at all times as to exert at least twice the force necessary to transmit full load torque, so as to ensure against excessive belt slippage on starting torque or at overloads. It is accordingly another object of my invention to provide a system whereby the belt tightening force is responsive at all times to the load requirements, so that this force is increased only when the torque transmitted is increased. In this way, undue wear of the belt is eliminated.

This invention possesses many other advantages, and has other objects which may be made more easily apparent from a consideration of several embodiments of the invention. For this purpose there are shown a few forms in the drawings accompanying and forming part of the present specification. These forms shall now be described in detail, illustrating the general principles of the invention; but it is to be understood that this detailed description is not to be taken in a limiting sense, since the scope of the invention is best defined by the appended claims.

Referring to the drawings:

Fig. 4 is a horizontal sectional view of a substantially entirely enclosed power unit showing another form of the invention;

Fig. 6 is a view similar to Fig. 4 of a further modification;

Fig. 7 is a plan view partly in section of a still further embodiment of the invention; and Fig. 8 is a side elevation of the embodiment shown in Fig. 7.

Figure 1:
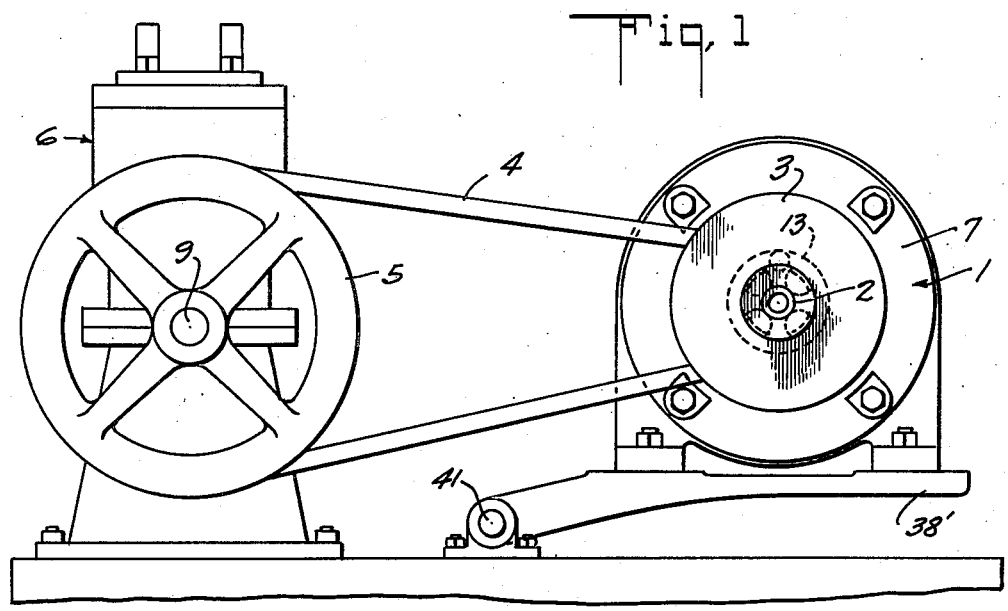
Figure 1 is a side elevation of a system using an electric motor drive for an appropriate load, incorporating the invention.
Figure 2:
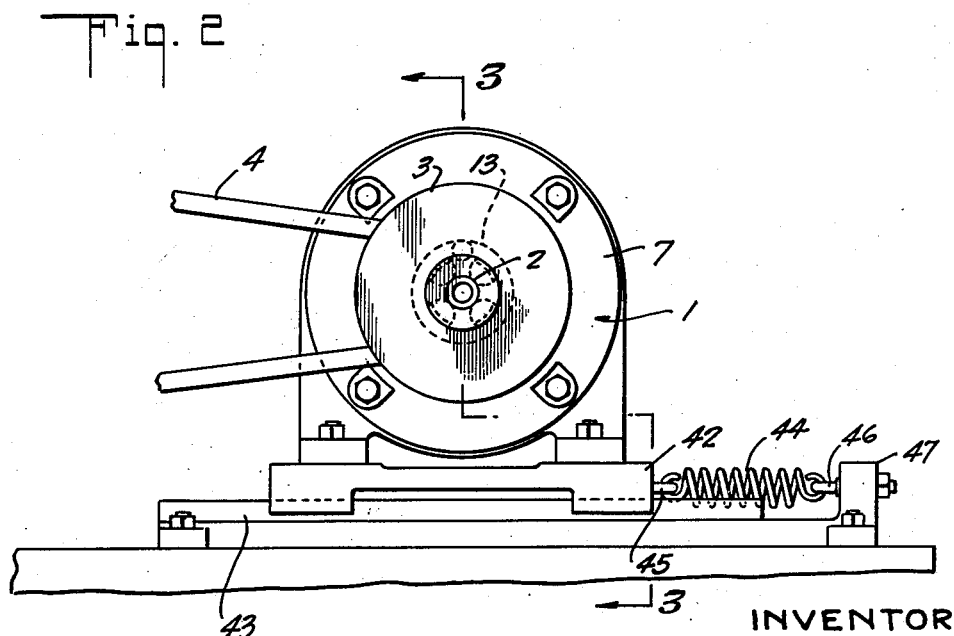
Fig. 2 is a fragmentary view showing an alternate form of mounting for the motor.
Figure 3:
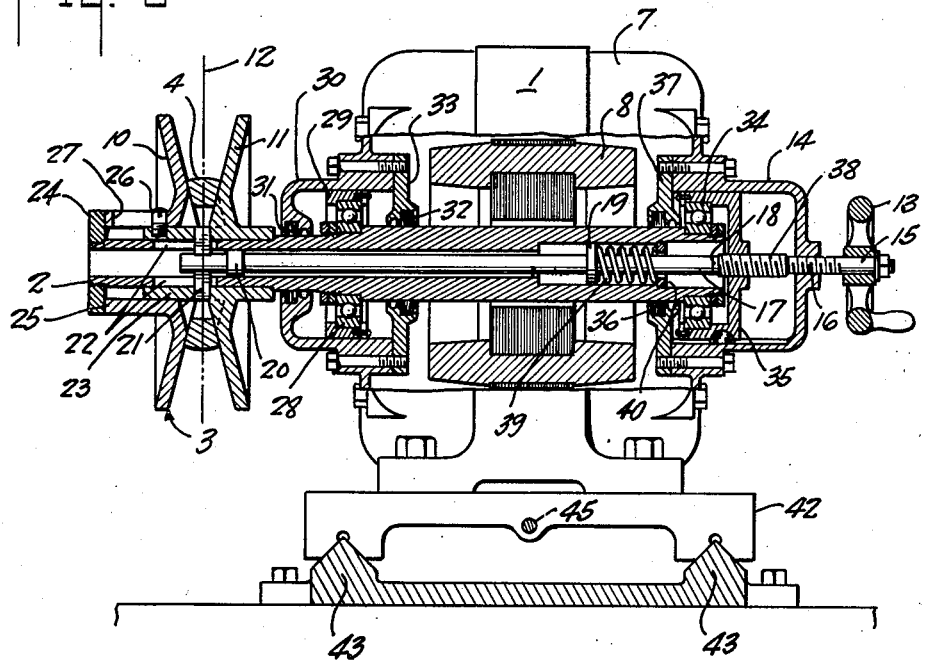
Fig. 3 is a sectional view taken along plane 3—3 of Fig. 2.

In Figs. 1, 2, and 3, an electric motor drive is illustrated, incorporating an electric motor 1. In both forms of the mounting shown in Figs. 1 and 2, respectively, the electric motor 1 has a shaft 2 upon which is mounted a variable diameter pulley structure 3. This pulley structure may be connected as by a flexible V-belt 4 to a driven pulley 5 connected to drive any appropriate mechanical load, such as an air compressor 6. The motor 1 is shown as having a stator 7 and a rotor 8. This rotor 8 is rigidly mounted on shaft 2 and is indicated in merely a diagrammatic fashion in Fig. 3.

In order to vary the ratio of transmission between the driving shaft 2 and the driven shaft 9, upon which pulley 5 is mounted, the adjustable pulley structure 3 is utilized. This pulley structure includes a pair of relatively axially adjustable sections 10 and 11 (Fig. 3). Each of these sections has an inclined belt engaging surface, the surfaces being in opposed relation and in contact with opposite sides of the flexible V-belt 4. In the position shown in Fig. 3, the effective diameter of pulley structure 3 is at a minimum, the opposed faces of sections 10 and 11 being separated by the maximum distance. If, however, these sections 10 and 11 be brought closer together, the belt 4 moves radially outward between these inclined faces and the effective pulley diameter increases.

The manner in which these sections 10 and 11 are adjusted to vary the effective pulley diameter is such that the alinement of the belt 4 between the pulleys 3 and 5 is not disturbed. In order to accomplish this, it is apparent that sections 10 and 11 must be moved in opposite directions from a center line 12 passing through the belt, as shown in Fig. 3.

This opposite movement of sections 10 and 11 is accomplished by rotating a hand wheel 13, and by the aid of a mechanism now to be described.

Fastened to the right hand side of the motor casing is a stationary guide and support 14 through which a screw member 15 is threaded. The free end of the screw member carries a hand wheel 13. This screw member is thus moved axially by rotation of hand wheel 13. Axial movement of the screw member 15 to the left serves to move the section 11 toward the left for increasing the effective pulley diameter. The extent of this movement is determined by the pitch of the threads in portion 16 of member 15, which portion 16 is in threaded engagement with the stationary member 14.

For moving section 11, the left hand end of member 15 is in mechanical engagement with the rod 17 which extends inside of the shaft 2, made hollow for this purpose. This rod 17 is separated at its right hand end from the screw member 16 by a long washer 18, such as of fibre, which may be fastened to either one of the two members 15 or 17, and withstands the rubbing action due to the relative rotation between rod 17 and screw member 15. Furthermore, rod 17 is guided in the hollow shaft 2 as by the aid of collars 19 and 20. At its left hand end the rod 17 carries a transverse pin 21 passing through appropriate slots 22 in shaft 2 and rigidly fastened to the hub 23 of member 11. It is thus apparent that as rod 17 is urged toward the left by screwing in the screw member 15, the section 11 is also moved to the left by the aid of the transverse pin 21. Since the transverse pin 21 fits inside of slots 22, it is apparent that there is a driving connection between the shaft 2 and the section 11.

As clearly illustrated in Fig. 3, the hub 23 of section 11 is slidable along a reduced portion of shaft 2.

Simultaneously with the movement of section 11 to the left, section 10 is moved by an equal amount to the right. This is accomplished by moving the shaft 2 to the right. This shaft 2 carries an end abutment 24 which engages the left hand end surface of hub 25 of section 10. This hub 25 is connected to be driven by the shaft 2 as by the aid of a stud 26 attached to the hub 23 of section 11 and extending through a slot 27 in hub 25. The manner in which shaft 2 is moved toward the right as rod 17 moves to the left will now be described.

At the left hand side of motor 1, shaft 2 is supported in thrust ball bearings 28. The inner race of the ball bearings is firmly secured on a shoulder on shaft 2. The outer race is held in a collar 29 which is slidable in a stationary cylindrical support 30 forming a part of the end wall of motor 1. As is usual, felt dust washers 31 and 32 may be provided for the shaft, held respectively in the stationary member 30 and in a cover member 33.

The right hand end of the shaft 2 is supported by thrust ball bearings 34. The inner race of this bearing structure is securely fastened on a shoulder on shaft 2. The outer race is securely fastened inside of an axially movable support 35. This axially movable support is splined inside of the stationary support 14, thereby constraining it against angular movement. Furthermore, dust felt washer 36 can be supported in a cover member 37 fastened to the inner side of the right hand wall of motor 1. In order to move the axially movable support 35, screw member 15 carries a threaded portion 38 engaging a central threaded aperture in member 35. The pitch of the threads of portion 38 is twice that of the threads that engage stationary member 14, and is in the same direction. In this way, for one revolution of wheel 13, the screw member 15 is moved to the left by a unit of length equivalent to the pitch of the screw threads engaging in part 14. The guide 35 is, however, moved to the right with respect to threaded part 38 by a distance equivalent to twice the axial movement of member 15 in support 14. However, since member 15 has moved to the left, the total movement (with respect to a stationary point) of the guide 35 is exactly the same as the axial movement of member 15, but in the opposite direction thereto.

By causing the threaded member 15 to move to the left the pulley diameter is increased. By reversing this direction of movement the belt 4 exerts a pressure between the two sections 10 and 11 and causes them to separate, the extent of separation being determined by contact of the right hand end of rod 17 with the screw member 15, and the contact of the left hand surface of hub 25 with collar 24. It is thus clear that the sections 10 and 11 are constrained against axial movement for any adjustment, on the one hand by the adjusting means, and on the other hand by the pressure of belt 4. It is also apparent that since members 10 and 11 are moved by equal increments but in opposite directions with respect to the center line 12, the belt 4 stays in alinement with pulley 5. If desired, a compression spring 39 can be inserted between collar 19 and a collar 40 threaded into the right hand end of the shaft 2. This compression spring acts in a direction to move sections 10 and 11 toward each other, thereby automatically taking up belt wear.

In order to keep the belt 4 in proper tightened condition at all times, the stator frame 7 is fastened to a movable mounting. In the form shown in Fig. 1, this movable mounting is in the form of a base 38' pivoted on a stationary pin 41. Thus the weight of the entire motor structure can be used to keep the belt 4 tight, but in addition it is preferred to utilize another force for urging the base 38 in a clockwise direction as viewed in Fig. 1. This other force is the reactive torque of the stator member 7. Thus if the rotor 8 is rotating in a counterclockwise direction as viewed in Fig. 1, the reaction of the stator 7 is in a clockwise direction, forming a turning couple. This turning couple exerts a torque (equivalent to the torque of the couple) about pivot 41 and in a downward direction as illustrated in Fig. 1.

The advantage of the utilization of the stator reactive torque is that the force for tightening the belt is variable in accordance with the varied torque imposed upon the motor. The greater the torque the more the belt is tightened. Thus during the starting period when high starting torques are necessary, the belt is held very tightly against sections 10 and 11, and to an extent sufficient to produce a belt pressure needed to drive the load. As the motor comes up to speed, the torque is reduced, so that the belt pressure is also reduced. As the motor becomes loaded more and more after speed is attained, the motor torque increases, causing greater tension on the belt. It is thus seen that there is a nice balance between the load requirements of the motor and the belt tightening force. In other words, variations in the belt tightening force are responsive to variations in the motor torque.

Since the diameter of pulley 5 is fixed, it is apparent that a reduction in the effective diameter of pulley structure 3 would make it necessary for the movable mounting 38' to move downwardly to take up the slack; and conversely when the effective diameter of pulley structure 3 is increased, the movable mounting 38' moves upwardly, to bring the axis of shafts 2 and 6 together.

It is apparent that the diameter of pulley structure 3 can be reduced even during standstill. In this way, motor 1 can be started at reduced speed of the load, the diameter of motor pulley 3 being previously reduced to the desired size.

In the modification shown in Fig. 2, the reactive torque of stator structure 7 is not utilized for producing a variable belt tightening effect. In this form, stator structure 7 is mounted on a sliding base 42 sliding on a pair of V-rails 43. A tension spring 44 exerts a force tending to pull the base 42 toward the right and to keep the belt 4 tightened. One end of this tension spring is anchored in an eye-bolt 45 attached to the right hand side of base 42; and the right hand end of spring 44 is anchored in an eye-bolt 46 fastened in a boss 47 formed on the stationary part of the structure.

Figure 5:
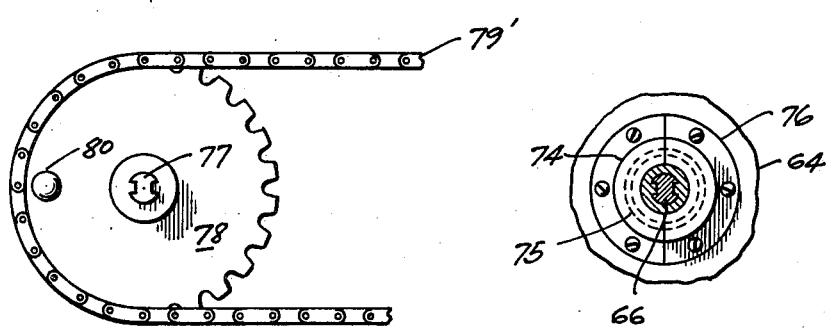
Fig. 5 is a fragmentary view taken substantially along the plane 5—5 of Fig. 4.

It is possible to vary the effective diameters of both the driven and driving pulley structures by a mechanism similar to that just described. Such an arrangement, in which the effective pulley diameters are inversely varied is illustrated in Figs. 4 and 5. In this form, there is a casing 48 which houses the variable pulley structures 49 and 50. Pulley structure 49 is mounted on shaft 51 of an electric motor 52. This electric motor has its right hand end housing 53 tightly held in a flange 54 formed on a wall of casing 48.

Both of the pulley structures 49 and 50 have movable sections 55—56 and 57—58 operated by a mechanism substantially similar to that shown in Fig. 3. Thus the driven shaft 59 is hollow and is appropriately journalled at its right hand end in a thrust ball bearing structure 60 supported on casing 48. Sliding over this shaft 59 is a long sleeve 61 which corresponds to the hollow shaft 2 of Fig. 3. This sleeve 61 is journalled at its left hand end by the aid of a thrust ball bearing structure 62 supported in an axially sliding member 63. A stationary guiding support 64 is provided and fastened to the edge of a boss 65 in casing 48. A screw member 66 is threaded in an aperture in the stationary member 64 and contacts at its right hand end with an operating rod 67 that extends inside of the shaft 59. The right hand end of this shaft 67 carries a transverse pin 68 extending through slots in both shaft 59 and sleeve 61 and into the hub 69 of adjustable section 58.

It is thus apparent that by turning the screw member 66 to cause it to move axially toward the right, the pulley section 58 is correspondingly moved to the right over the sleeve 61, to increase the effective pulley diameter. At the same time, right hand section 57, joined to the sleeve 61 as by a set screw 70, is moved toward the left by a movement of the slide 63. This slide 63 is moved to the left by the aid of the threaded portion 71 of the screw member 66. This threaded portion 71 has a pitch twice as great as that of the threads engaging in stationary support 64, and is in the same direction. As heretofore explained, this causes the pulley sections 57 and 58 to move by equal amounts with respect to the center line of the flexible belt 72.

In order to rotate screw member 66 a wheel 73 is splined thereto, and is held against axial movement as by the aid of a bisected bearing structure 74. This bearing structure has a flange 75 entering into a groove formed in the hub of wheel 73. It also has another flange 76 which is fastened to the left hand end of the stationary support 64. In other respects the structure is similar to that shown in Fig. 3.

The adjustable pulley structure 49 is provided with a mechanism similar to that just described, and operated by a screw member 77. This screw member 77 is splined in a wheel 78 which is held against axial movement by the split bearing support 79. The two wheels 73 and 78 are joined together as by a link belt 79' for simultaneous operation of the screw members 66 and 77. To facilitate manual operation, a handle 80 can be provided on wheel 78. Furthermore, the threads on member 77 are cut in opposite directions to the corresponding threads in member 66. In this way the effective pulley diameter of structure 49 is varied in a reversed direction from that of the pulley structure 50. The splined connection between the wheels and the screw members is advantageous in order to keep the flexible link belt 79 constantly in alinement between the wheels 73 and 78, while yet permitting these screw members 66 and 77 to move in opposite axial directions. For the position shown in Fig. 4, the pulley structure 49 is at minimum effective diameter, while pulley structure 50 is at maximum effective diameter.

As is apparent, the driven shaft 59 can have an extension 81 which projects outside of the casing 48 for appropriate connection to a load. Furthermore, as before, a fibre washer 82 can be interposed between the contiguous ends of a rod 67 and screw member 66, to take up all wear due to the relative angular motion of these parts.

It is not necessary to adjust both pulley structures; instead one of the them may have a spring mechanism for automatically adjusting the pulley structure to keep the belt in tightened condition. Such an arrangement is shown in Fig. 6.

In this form there is a casing 83 which encloses the adjustable pulley structures 84 and 85. Adjustable pulley structure 85 is mounted to drive a driven shaft 86. In this way the adjustable structure 85 can be positively adjusted. Thus shaft 86 is hollow and has rigidly fastened thereon the pulley section 87, as by a key 88. The right hand end of the shaft 86 is supported by appropriate thrust ball bearings 89 which are arranged around the hub 90 of section 87. The left hand section 91 of structure 85 can be axially adjusted as by the aid of a rod 92 which extends into the shaft 86 made hollow at its left hand end for this purpose. The hub 93 of the axially adjustable section 91 slides on the shaft 86 and is manually joined to the rod 92 as by a transverse pin 94 passing through the rod 92, as well as through slots 95 in shaft 86.

At the left hand end of shaft 86 appropriate thrust bearings 96 are provided in a stationary boss 97. A screw member 98 is threaded into a threaded aperture in boss 97 and can be rotated as by hand wheel 99. A thrust washer 100 can be fastened to one of the members 92 or 98. It is apparent that by rotating hand wheel 99 in one or the other direction, the section 91 can be moved toward and from the corresponding section 87. For the position in Fig. 6, the pulley structure 85 is shown at maximum pulley diameter. In this instance, the flexible belt 101 connecting the two pulley structures, moves in an axial direction as the pulley diameter is varied.

The pulley structure 84 is so arranged that the belt 101 is automatically alined and the proper effective diameter of pulley structure 84 is automatically attained. Thus the driving shaft 102, which extends from the electric motor 103, carries a hollow extension 104. The left hand section 105 is rigidly fastened to the shaft 102 as by a set screw 106. The right hand section 107, is, however, slidable over the hollow extension 104 but is prevented from relative angular motion by a stud 108. This stud 108 passes through the hub of section 107 as well as through slots 109 in the hollow extension 104. The section 107 is urged resiliently toward section 105 as by a compression spring 110 accommodated in the hollow extension 104. The left hand end of compression spring 110 presses against the stud 108 to urge it toward the left. The right hand end is guided by the cylindrical extension 111 of headless screw 112. This headless screw 112 is threaded into the right hand end of hollow extension 104 and serves as an abutment for the right hand end of spring 110.

If desired, oiling grooves 113 can be provided in the inner periphery of the hub of section 107. This oiling groove can be filled with oil through a threaded aperture 114 normally closed by a screw 115. Furthermore, a cover 116 can be provided for the extension of the rotating structure.

It is apparent that as section 91 of pulley structure 85 is retracted toward the left, the belt 101 moves inwardly between sections 91 and 97. As it does so, the compression spring 110 urges the section 107 toward the left to take up the resultant belt slack. The belt 101 stays in alinement because section 105 is stationary, and belt 101 merely moves up on the inclined face of section 105 while it moves down on the inclined face of section 87.

In Figs. 7 and 8, there is disclosed a structure similar to that shown in Fig. 1, in that the motor 117 is mounted on a pivotally supported base 118. In this case, however, the base 118 is provided externally of a pulley casing 119 which houses the driven pulley structure 120. The driving pulley 121 is of fixed diameter and is rigidly fastened to the shaft 122 of motor 117. The flexible belt 123 passes through an appropriate slot 124 in casing 119 to engage the adjustable pulley structure 120.

The adjustable pulley structure 120 can in general be adjusted by a mechanism similar to that disclosed in connection with Fig. 4. Thus the driven shaft 125 is journalled at the right hand end in appropriate thrust ball bearings 126. It may also have an extension 127 for appropriate connections to a load.

Both of the pulley sections 128 and 129 are adjustable to keep the belt 123 in accurate alinement. Thus section 129 is arranged to be operated by a rod 130 extending into the hollow left hand portion of shaft 125. This rod 130 has a transverse pin 131 engaging the hub 132 of section 129. This hub is slidable on the elongated hub 133 of the other section 128. This elongated hub carries the inner race of a thrust ball bearing structure 134. The outer race of this ball bearing structure is supported in axially movable guide 135 in the hollow stationary boss or support 139. Opposite axial movement of rod 130 and of hub 133 is secured by the aid of a screw member 136 acting in a manner entirely similar to that heretofore disclosed. The right hand end of the screw member 136 acts mechanically against the contiguous end of rod 130. At the same time the portion 137 of screw member 136 serves to move the axially movable support 135 in a direction opposite to the movement of rod 130. For manual manipulation, a hand wheel 138 can be fastened to the screw member 136.

As before, the threaded portion 136 has a pitch twice that of the threaded portion which engages the stationary member 139, and is in the opposite direction, whereby the resultant motion of the section 128 is equal and opposite to the motion of section 129.

Furthermore, as in the form of Fig. 1, the reactive torque of the motor stator can be utilized to effect the belt tension.

I claim:

1. In a variable diameter pulley structure having a pair of axially adjustable sections with opposed inclined faces, forming by adjustment, variable effective pulley diameters, a hollow shaft carrying one of said sections, a rod extending into the shaft and connected to the other section, an axially movable thrust bearing support for the shaft, and a screw mechanism for simultaneously axially moving the bearing support and the rod, in equal increments and in opposite directions.

2. In a variable diameter pulley structure having a pair of axially adjustable sections with opposed inclined faces, forming by adjustment, variable effective pulley diameters, a hollow shaft carrying one of said sections, a rod extending into the shaft and connected to the other section, an axially movable support, a stationary guide for the support, a thrust bearing for the shaft and supported by the support, and a screw mechanism having a portion contacting with the rod, and threadedly engaging both the stationary guide and the movable support, the pitch of the threads in the support being double and in the same direction as that of the threads in the stationary guide.

3. In a system of the character described, a driving shaft, a driven shaft, means for supplying a rotary power to the driving shaft, an adjustable diameter pulley structure on the driving shaft, said structure including a pair of relatively axially movable pulley sections with opposed inclined faces, means for adjusting the relative axial position of said pulley sections, a flexible belt for the structure, said power supplying means having a stator exerting a reaction torque in opposition to the load torque, and means for pivotally mounting the stator so that said reaction torque is in a direction to tighten the belt.

4. In a system of the character described, an electric motor having a stator, a rotor, as well as a shaft for the rotor, an adjustable diameter pulley structure on the shaft, said structure including a pair of relatively axially movable pulley sections with opposed inclined faces, means for adjusting the relative axial position of said pulley sections, a flexible belt engaging between the faces, and a pivotal support for the motor, said motor having a direction of rotation such that the reactive torque of the stator produces a force urging the pivotal support in a belt tightening direction.

5. In a system of the character described, an electric motor having a shaft, a fixed diameter pulley on the motor, means for movably mounting the motor, a hollow driven shaft, a variable diameter pulley structure on the driven shaft, said structure having a pair of axially adjustable sections with opposed inclined faces, forming by adjustment, variable effective pulley diameters, one of said sections being axially fixed to the hollow shaft, an axially adjustable rod extending into the shaft and connected to the other section, means for simultaneously axially moving the rod and the shaft in opposite directions and by equal increments, a flexible belt connecting the two pulleys, and means for adjusting the center distance between the axes of said shafts in accordance with the adjustment of said variable diameter pulley structure.

6. In a system of the character described, an electric motor having a shaft, a fixed diameter pulley on the motor, said motor having a stator exerting a reactive torque, means for pivotably mounting the stator, a hollow driven shaft, a variable diameter pulley structure on the driven shaft, said structure having a pair of axially adjustable sections with opposed inclined faces, forming by adjustment, variable effective pulley diameters, one of said sections being axially fixed to the hollow shaft, an axially adjustable rod extending into the shaft and connected to the other section, means for simultaneously axially moving the rod and the shaft in opposite directions and by equal increments, and a flexible belt connecting the two pulleys, said pivotable mounting for the stator providing means for adjusting the center distance between the axes of said shafts in accordance with the adjustment of said variable diameter pulley structure, and the reaction of the stator being in a direction urging the pivotal mounting in belt tightening direction.

7. In an adjustable speed drive, a pair of pulley structures, a belt in active driving relation to said pulley structures, one of said pulley structures having an adjustable effective diameter, said adjustable pulley structure having a pair of pulley sections with opposed inclined belt engaging faces, forming by relative axial adjustment variable effective pulley diameters, means for adjusting the axial positions of said pulley sections by substantially equal and opposite amounts, said adjusting means being coaxial with said pulley sections, and means for adjusting the center distance between the axes of said pulley structures, in accordance with the adjustment of said adjustable pulley structure.

8. In an adjustable speed drive, a pair of pulley structures, a belt in active driving relation to said pulley structures, one of said pulley structures having an adjustable effective diameter, said adjustable pulley structure having a pair of pulley sections with opposed inclined belt engaging faces forming, by relative axial adjustment variable effective pulley diameters, means for adjusting the relative axial positions of said pulley sections, said adjusting means being coaxial with said pulley sections, a support for said adjustable pulley structure, said support forming a guide for movement of the adjustable pulley structure in a direction to vary the center distance between the axes of said pulley structures, and means for adjusting the center distance between the axes of said pulley structures in accordance with the adjustment of said adjustable pulley structure.

9. In an adjustable speed drive, a pair of pulley structures, a belt in active driving relation to said pulley structures, one of said pulley structures having an adjustable effective diameter, said adjustable pulley structure having a pair of pulley sections with opposed inclined belt engaging faces, forming by relative axial adjustment variable effective pulley diameters, means for adjusting the axial position of said pulley sections by substantially equal and opposite amounts, said adjusting means being coaxial with said pulley sections, a support for said adjustable pulley structure, said support forming a guide for movement of the adjustable pulley structure in a direction to vary the center distance between the axes of said pulley structures, and means for adjusting the center distance between the axes of said pulley structures in accordance with the adjustment of said adjustable pulley structure.

10. In an adjustable diameter pulley structure, a pair of pulley sections with opposed inclined belt engaging faces, forming by relative axial adjustment variable effective pulley diameters, a hollow shaft having one of said pulley sections secured thereto, and means for adjusting the axial position of the other of said pulley sections, said means comprising a rod extending into said shaft and axially fixed with respect to said adjustable pulley section, a supporting member axially fixed with respect to said hollow shaft, a lead screw threadedly engaging said supporting member, a bearing member for transmitting axial force between said lead screw and said rod, whereby a rotation of said lead screw produces a corresponding axial adjustment of said bearing member, said rod and the pulley section associated therewith.

11. In an adjustable diameter pulley structure having a pair of pulley sections with opposed inclined belt engaging faces, forming by relative axial adjustment variable effective pulley diameters, a hollow shaft having one of said pulley sections secured thereto, a rod extending into the shaft and axially fixed with respect to the other of said pulley sections, said rod being rotatable with the corresponding pulley section, and a mechanism for adjusting said rod, including a screw supported coaxial with said shaft, a bearing member for transmitting axial force between said screw and said rod, and a threaded guide for the screw, whereby a rotation of said screw produces a corresponding axial adjustment of said screw, of said rod and the pulley section associated therewith.

12. In an adjustable speed drive, a driving shaft, a driven shaft, a pair of adjustable diameter pulley structures in respective axial driving relation to each of said shafts, a flexible belt in active driving relation to said pulley structures, each of said pulley structures including a pair of pulley sections with opposed inclined belt engaging faces forming by relative axial adjustment variable effective pulley diameters, means for adjusting the relative axial positions of the pulley sections of each of said pulley structures, including interlocking means for compensatingly and oppositely adjusting said pulley structures, said adjusting means for each of said pulley structures including a bearing member axially fixed with respect to one of said pulley sections for supporting as well as axially adjusting said section, an axially adjustable member engaging said bearing member, a lead screw co-axial with said pulley structure and actively engaging said axially adjustable member, and means for transmitting axial force between said lead screw and the other of said pulley sections, whereby a rotation of said lead screw produces a relative axial adjustment of said pulley sections.

13. The structure as set forth in claim 12, in which said interlocking means includes a pair of wheels in respective axial driving relation to each of said lead screws, and means for interlocking of rotation of said wheels, whereby said pulley structures are compensatingly and oppositely adjusted.

14. In an adjustable speed drive, a driving pulley structure, a driven pulley structure, a belt in active driving relation to said pulley structures, said driving pulley structure having an adjustable effective diameter, means for adjusting the effective diameter of said driving pulley structure, said adjusting means being coaxial with said pulley structure, and a pivotal support for said driving pulley structure, said support providing means for adjusting the center distance between the axes of said pulley structures in accordance with the adjustment of said adjustable diameter pulley structure.

15. In a variable diameter pulley structure having a pair of pulley sections with opposed inclined belt engaging faces, forming by relative axial adjustment variable effective pulley diameters, a tubular member secured to one of said pulley sections, said tubular member providing means for supporting the other of said pulley sections, and means for adjusting the relative axial position of said pulley sections, said adjusting means including, a lead screw co-axial with said pulley structure, means maintaining said lead screw in fixed axial position with respect to one of said pulley sections, an axially adjustable member threadedly engaging said lead screw, and a bearing member for maintaining said axially adjustable member in fixed axial position with respect to the other of said pulley sections, whereby a rotation of said lead screw produces a relative axial adjustment of said pulley sections.

16. In an adjustable speed drive, a driving shaft, a driven shaft, a pair of adjustable diameter pulley structures in respective axial driving relation to each of said shafts, a flexible belt in active driving relation to said pulley structures, each of said pulley structures having a pair of pulley sections with opposed inclined belt engaging faces, forming by relative axial adjustment variable effective pulley diameters, means for adjusting the relative axial positions of the pulley sections of each of said pulley structures, including interlocking means for compensatingly and oppositely adjusting said pulley structures, said adjusting means for each of said pulley structures including a screw co-axial with the pulley structure, and means actively engaging said screw, whereby a rotation of said screw produces a corresponding relative axial adjustment of said pulley sections.

17. The structure as set forth in claim 16, in which said interlocking means includes a pair of wheels in respective axial driving relation to each of said screws, and means for interlocking the rotation of said wheels, whereby said pulley structures are compensatingly and oppositely adjusted.

18. In an adjustable pulley structure having a pair of pulley sections with opposed inclined faces, forming by relative axial adjustment variable effective pulley diameters, a rotatable hollow member having one of said pulley sections supported thereon, an axially adjustable rod extending into said hollow member, rotatable therewith and axially fixed with respect to the other of said pulley sections, and means for adjusting the axial position of said rod, said adjusting means including a stationary member, and a lead screw, normally stationary with respect to said hollow member, threadedly engaging said stationary member, whereby a rotation of said lead screw produces an axial adjustment of the lead screw, the rod and the pulley section associated therewith.

19. In an adjustable speed drive, a driving pulley structure, a driven pulley structure, a belt in active power transmitting relation to said pulley structures, one of said pulley structures having an adjustable effective diameter, means for adjusting the effective diameter of said adjustable pulley structure, said adjusting means being coaxial with the pulley structure, an electric motor having a stator and a shaft in coaxial driving relation to one of said pulley structures, and a pivotal support for said electric motor, said pivotal support providing means for adjusting the center distance between the axes of said pulley structures in accordance with the adjustment of said adjustable diameter pulley structure.

20. In an adjustable speed drive, a driving pulley structure, a driven pulley structure, a belt in active power transmitting relation to said pulley structures, one of said pulley structures having an adjustable effective diameter, means for adjusting the effective diameter of said pulley structure, an electric motor including a stator and having a shaft in coaxial driving relation to one of the pulley structures, and a pivotal support for said motor, said support providing means for adjusting the center distance between the axes of said pulley structures in accordance with the adjustment of the adjustable diameter pulley structure, said motor having a direction of rotation such that the reactive torque of the motor stator produces a force urging the motor about the pivotal support in belt tightening direction.

21. In an adjustable speed drive, a pair of pulley structures, a belt in active driving relation to said pulley structures, one of said pulley structures having an adjustable effective diameter and including a pair of pulley sections with opposed inclined faces, forming by relative axial adjustment variable effective pulley diameters, means for adjusting the relative axial position of said pulley sections, said adjusting means being co-axial with the pulley structure, and a support for one of said pulley structures, said support forming a guide for movement of the adjustable pulley structure in a direction to vary the center distance between the axes of said pulley structures in accordance with the adjustment of said adjustable pulley structure.

22. In an adjustable speed drive, a pair of pulley structures, a belt in active driving relation to said pulley structures, one of said pulley structures having an adjustable effective diameter, said adjustable pulley structure having a pair of pulley sections with opposed inclined belt engaging faces, forming by relative axial adjustment, variable effective pulley diameters, means for adjusting the axial positions of said pulley sections by substantially equal and opposite amounts, said means being coaxial with the pulley structure and including a member passing through one of said pulley sections for adjusting the axial position of the other of said pulley sections, and means for adjusting the center distance between the axes of the pulley structures, in accordance with the adjustment of the adjustable pulley structure.

23. In an adjustable pulley structure having a pair of pulley sections with opposed inclined faces, forming by relative axial adjustment variable effective pulley diameters, a hollow member secured to one of said pulley sections, means for slideably supporting the other of said pulley sections on said hollow member, and means for adjusting the relative axial position of the pulley sections, said adjusting means including a lead screw coaxial with said pulley structure having two threaded sections, the threads on one of said sections having a different pitch from those on the other section, said lead screw being arranged to determine the axial position of the pulley section slidable on said hollow member, and being axially adjustable by one of said threaded sections with respect to the hollow member, a bearing axially fixed with respect to the hollow member, an axially adjustable member engaging said bearing and threadedly engaging the other threaded section of said lead screw, whereby rotation of said lead screw produces a relative axial adjustment of said pulley sections.

24. In an adjustable pulley structure having a pair of pulley sections with opposed inclined faces, forming by relative axial adjustment variable effective pulley diameters, a hollow member carrying one of said pulley sections, a rod extending into said hollow member and axially fixed with respect to the other of said pulley sections, a bearing member secured to said hollow member, and a screw mechanism for simultaneously axially moving the bearing member and the rod, in equal increments and in opposite directions.

25. In an adjustable speed drive, a driving pulley structure, a driven pulley structure, a belt in active driving relation to said pulley structures, each of said pulley structures having a pair of pulley sections with opposed inclined faces, forming by relative axial adjustment variable effective pulley diameters, means for adjusting the relative axial positions of the pulley sections of each of said pulley structures, including interlocking means for simultaneously and oppositely adjusting the effective diameters of said pulley structures, said adjusting means for each of said pulley structures including a lead screw axially fixed with respect to one of the pulley sections of the corresponding pulley structure, a bearing member axially fixed with respect to the other of said pulley sections, an axially adjustable member engaging said bearing member and threadedly engaging said lead screw, whereby a rotation of said lead screw produces a corresponding relative axial adjustment of said pulley sections.

26. The structure as set forth in claim 25 in which said interlocking means includes a pair of wheels in respective axial driving relation to each of said lead screws, and means for interlocking the rotation of said wheels, whereby said pulley structures are compensatingly and oppositely adjusted.

27. In combination: a slidable base member; an electric motor on said slidable base member and including a rotatable shaft; a pulley means on said shaft of the adjustable V-type and including a pair of flange members, one of said flange members being movable toward and away from the other to adjust the effective diameter of said pulley means; adjustment means mechanically interconnecting said flange members for changing the position therebetween and holding the said flange members in fixed relative position when said adjustment means is not being moved; a driven pulley rotating about a fixed axis; resilient means adapted to move said slidable base member as said adjustment means is actuated; and belt means operatively connecting said driven pulley and said pulley means.

28. In combination: a base structure; track means carried by said base structure; a carriage movable along said truck means; a base member movable with said carriage; an electric motor secured to said base member to move in a direction determined by said track means; a pulley means carried by said motor and of the adjustable V-type including a pair of flange members, one of said flange members being movable toward and away from the other; a driven pulley; resilient means adapted to move said carriage as said flange members are moved; and belt means operatively connecting said driven pulley and said pulley means.

29. In combination: a drive shaft; a driven shaft; an adjustable pulley means on one of said shafts of the adjustable V-type and including flange members, one of said flange members being movable toward and away from the other; control means mechanically interconnecting said flange members to change the spacing thereof and positively hold these flange members in a desired spaced relationship; a carriage on which one of said shafts is journalled; means supporting said carriage to move in a flat plane parallel to the axis of said shaft journalled thereby, a movement of said carriage thus changing the axial spacing of said shafts; and means simultaneously moving said control means and said carriage to compensate for the difference in effective diameter of said adjustable pulley means when said spacing of said flange members is changed by said control means.

30. A combination as defined in claim 29, in which said last-named means includes means resiliently urging said carriage to move in said flat plane whereby said resilient means is moved as the spacing of said flange members is changed.

31. In combination: a slidable base member; an electric motor on said slidable base member and including a rotatable shaft; a pulley means on said shaft of the adjustable V-type and including a pair of flange members, one of said flange members being movable toward and away from the other to adjust the effective diameter of said pulley means; adjustment means mechanically interconnecting said flange members for changing the position therebetween and holding said flange members in fixed relative position when said adjustment means is not being moved, said adjustment means including means rotatable about the axis of rotation of said shaft; a driven pulley rotating about a fixed axis; and belt means operative connecting said driven pulley and said pulley means.

32. In combination: a slidable base member; an electric motor on said base member including a drive shaft; a driven shaft operatively aligned with said drive shaft; a pulley on said drive shaft and a pulley on said driven shaft, one of said pulleys being of the adjustable V-type having a pair of flange members, one of said flange members being movable toward and away from the other to adjust the effective diameter of said pulley; adjustment means mechanically interconnecting said flange members for changing the position therebetween and holding said flange members in fixed relative position when said adjustment means is not being moved; belt means operatively connecting said pulleys; and resilient means operatively connected to said sliding base member and cooperating with said belt means in controlling the position of said motor as said adjustment means is operated whereby movement of said adjustment means changes the distance between said shaft of said motor and said driven pulley.

33. In an adjustable speed drive, a driving pulley structure, a driven pulley structure, a belt in active driving relation to said pulley structures, one of said pulley structures having an adjustable effective diameter, means for adjusting the effective diameter of said pulley structure, an electric motor having a shaft in coaxial driving relation to one of said pulley structures, a pivotal support for said motor, said pivot being so located with respect to the pulley structures that the tendency of the motor to revolve about the pivot due to its weight is effective to vary the center distance between said pulley structures in response to adjustments in the diameter of the adjustable diameter pulley structure.

34. The structure set forth in claim 33, wherein the means for adjusting the diameter of the adjustable pulley structure is coaxial with respect to said structure.

GEORGE T. PFLEGER.